(12) United States Patent
Maggioni et al.

(10) Patent No.: US 6,353,428 B1
(45) Date of Patent: Mar. 5, 2002

(54) METHOD AND DEVICE FOR DETECTING AN OBJECT IN AN AREA RADIATED BY WAVES IN THE INVISIBLE SPECTRAL RANGE

(75) Inventors: Christoph Maggioni, München; Bernhard Kämmerer, Ottobrunn, both of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/355,168
(22) PCT Filed: Feb. 10, 1998
(86) PCT No.: PCT/DE98/00368
  § 371 Date: Jul. 23, 1999
  § 102(e) Date: Jul. 23, 1999
(87) PCT Pub. No.: WO98/38533
  PCT Pub. Date: Sep. 3, 1998

(30) Foreign Application Priority Data

Feb. 28, 1997 (DE) .......................................... 197 08 240

(51) Int. Cl.[7] ................................................. G09G 5/08
(52) U.S. Cl. ..................................................... 345/157
(58) Field of Search ................................ 345/156, 179, 345/180

(56) References Cited

U.S. PATENT DOCUMENTS

| | | |
|---|---|---|
| 5,031,228 A | 7/1991 | Lu |
| 5,138,304 A | 8/1992 | Bronson |
| 5,528,263 A | 6/1996 | Platzker et al. |
| 5,591,972 A | 1/1997 | Noble et al. |

FOREIGN PATENT DOCUMENTS

| | | |
|---|---|---|
| DE | 195 16 664 | 8/1996 |
| EP | 0 055366 A2 | 7/1982 |
| EP | 0 626 636 A2 | 11/1994 |

OTHER PUBLICATIONS

Pierre Wellner, The Digital Desk Calculator: Tangible Manipulation on a Desk Top Display, UIST, Nov. (1991), pp. 27–33.

Patent Abstracts of Japan, vol. 6, No. 179 (P–142), Sep. 14, 1982 & JP 57–094672 Hitachi Ltd., H. Osamu, Method for Inspecting Whether Parts are Present or Not, Jun. 12, 1982.

*Primary Examiner*—Steven Saras
*Assistant Examiner*—William C. Spencer
(74) *Attorney, Agent, or Firm*—Schiff Hardin & Waite

(57) ABSTRACT

The arrangement detects an object that is irradiated by waves in the invisible spectral range. Infrared illumination is preferably employed in order to recognize an object on a display projected onto an arbitrary surface that is displayed for the user in the visible spectral range and to be able to track the movement of this object. User interfaces produced by a computer can thus be projected onto an arbitrary background. Touch-free inputs can ensue on these user interfaces by moving the hand or with some other input unit, whereby the triggering of an action is coupled to a dwell for a prescribable time over a field linked to a control characteristic.

14 Claims, 2 Drawing Sheets

METHOD AND DEVICE FOR DETECTING AN OBJECT IN AN AREA RADIATED BY WAVES IN THE INVISIBLE SPECTRAL RANGE

BACKGROUND OF THE INVENTION

The invention is directed to an arrangement and to a method for detecting an object in an area irradiated by waves in the invisible spectral range.

In the framework of man-machine interaction, it is desirable when different limb dimensions such as, for example, head or hand or even abstract articles such as, for example, a pointer are recognized with a computer. When the recognition meets a real-time demand, then (partial) movements of the objects can be detected or, respectively, gestures can be recognized. One possible application is a projection of a user interface generated by a computer onto a prescribable area. The user reacts to the user interface touch-free in that he moves an input unit (finger, hand or pointer) on a control surface (switch of the surface).

A method for gesture recognition is known, for example, from German references DE 195 16 664C1.

Further, a projection with gesture operation is known from the references, Projection With Gesture Operation and Evaluation in the Visible range, U.S. Pat. No. 5,528,263, and an article, The Digital Desk Calculator: Tangible Manipulation on a Desk Top Display, Proc. of the UIST '91, 11.-13.11. 1991, pages 27–33 by P. Wellner.

In all known methods, the evaluation of the gesture ensues in the visible spectral range. There is thereby the problem, first, that the projection must differ from the subject carrying out the gesture; second, the color of the background onto which the projection ensues and the degree of ambient brightness can make the detection considerably more difficult through impossible.

SUMMARY OF THE INVENTION

It is an object of the present invention is comprised in enable a detection of an object introduced into a projected area, whereby mutual influence between projection and registration is avoided.

In general terms the present invention is an arrangement for the detection of an object in an area irradiated by waves in the invisible spectral range. A projector is configured such that a video image can be projected onto the area. A means for the emission of waves in the invisible spectral range is configured such that the area is essentially illuminated. A reception means is configured such that it registers the irradiated area. A computer is provided that is configured such that waves reflected from an object can be distinguished from visible, reflected waves using a recognition algorithm. The recognition algorithm detects the object.

Advantageous developments of the present invention are as follows.

A means for the emission of waves in the invisible spectral range has at least one infrared light source, and the reception means is at least one camera. The infrared light source is one of the following components; an infrared light-emifting diode (infrared LED), and an incandescent bulb with infrared filter. The camera has a filter that is transmissive only for infrared light. The filter of the camera is only transmissive for the spectral range of the infrared light-emitting diodes.

The area is transilluminated from below with infrared light, whereby the projection surface is implemented reflective in the visible spectral range and is implemented transmissive in the infrared spectral range.

A means for the emission of waves in the invisible spectral range has at least one means for the emission of ultraviolet radiation, and the reception means is at least one receiver for ultraviolet radiation.

A means for the emission of waves in the invisible spectral range has at least one means for the emission of ultrasound, and the reception means is at least one receiver for ultrasound.

The means for emission and the reception means lie on an optical axis.

At least one of the following surfaces is applied on the area; reflective fabric, reflex films, specific weave with prism-coated surface.

The present invention is also a method for detecting an object in an area irradiated by waves in the invisible spectral range. A video image that has at least one field with a function available to it is generated in the area by a computer and is projected onto a prescribable area. The object is moved into the area. The function of a field is triggered by the object in that the object dwells on the field for a prescribable time.

A mouse pointer is associated with the object, this being moved across the projected area by moving a finger of a user. The prescribable area is implemented by a canvas. The object for triggering the control characteristic is implemented as a finger, a hand or a pointer.

In order to detect an object in a prescribable area, it is irradiated for this purpose by waves whose wavelength lies in the invisible spectral range. A reception means is specifically balanced for an invisible spectral range corresponding to the waves and, accordingly, only picks up waves in this spectrum. The object to be detected reflects the waves in a different way then the background (for example, the skin absorbs infrared light more highly then do inorganic-smooth materials). Accordingly, the waves registered by the reception means can discover the object with a recognition algorithm and can detect the movement connected with the object.

A development of the invention is comprised in employing an infrared light source for the emission of the waves in the invisible spectral range. The infrared lights can thereby be realized as either at least one infrared light-emitting diode or at least one incandescent bulb with preceding infrared filter.

Expediently, the reception means is fashioned as camera. Given employment of the infrared light source, it is advantageous to equip the camera with a filter that is only transmissive for infrared light. When infrared light-emitting diodes are used as infrared light source, another expedient application is comprised in providing the camera with a filter that is only sensitive in the specific spectral range of the infrared light-emitting diodes.

It is also advantageous when the prescribable area is transilluminated with infrared light from below, whereby the projection surface is fashioned reflective in the visible spectral range and transmissive in the infrared spectral range.

Finally, it is advantageous when a unit that emits the waves in the invisible spectral range lies on the same optical axis as the reception means (camera).

It is also expedient when the surface on the irradiated area is composed either of reflective fabric, of reflex film or of a specific weave having prism-coated surface.

Further, the invention can also be utilized when ultrasound or ultraviolet radiation is employed instead of infrared light. The reception means is thereby to be specifically respectively designed for ultrasound or for ultraviolet radiation.

A method for the operation of the invention is expedient such that a video image that is generated by a computer and has at least one field with a control characteristic available to it is projected onto the area. The object is moved into this projected area, and the control characteristic is triggered by this object in that the object dwells for a prescribable time on the field linked with the control characteristic. Expediently, the object can be a finger, hand or a pointer. Further, a mouse pointer or some other input pointer can be associated with the object, this being moved over the projected area by moving, for example, the finger or, in general, the object that is employed for the input.

The projection can also ensue onto a canvas. An input occurs by pointing to this canvas with a prescribable object, in that at least one field with a control characteristic is projected onto the canvas by a computer, and the input object dwells over this field for a prescribable time. Let it be noted here that, without limitation, a hand, a finger or a pointer can, for example, can be assumed as object moved in the projected area.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS

Figure 1:
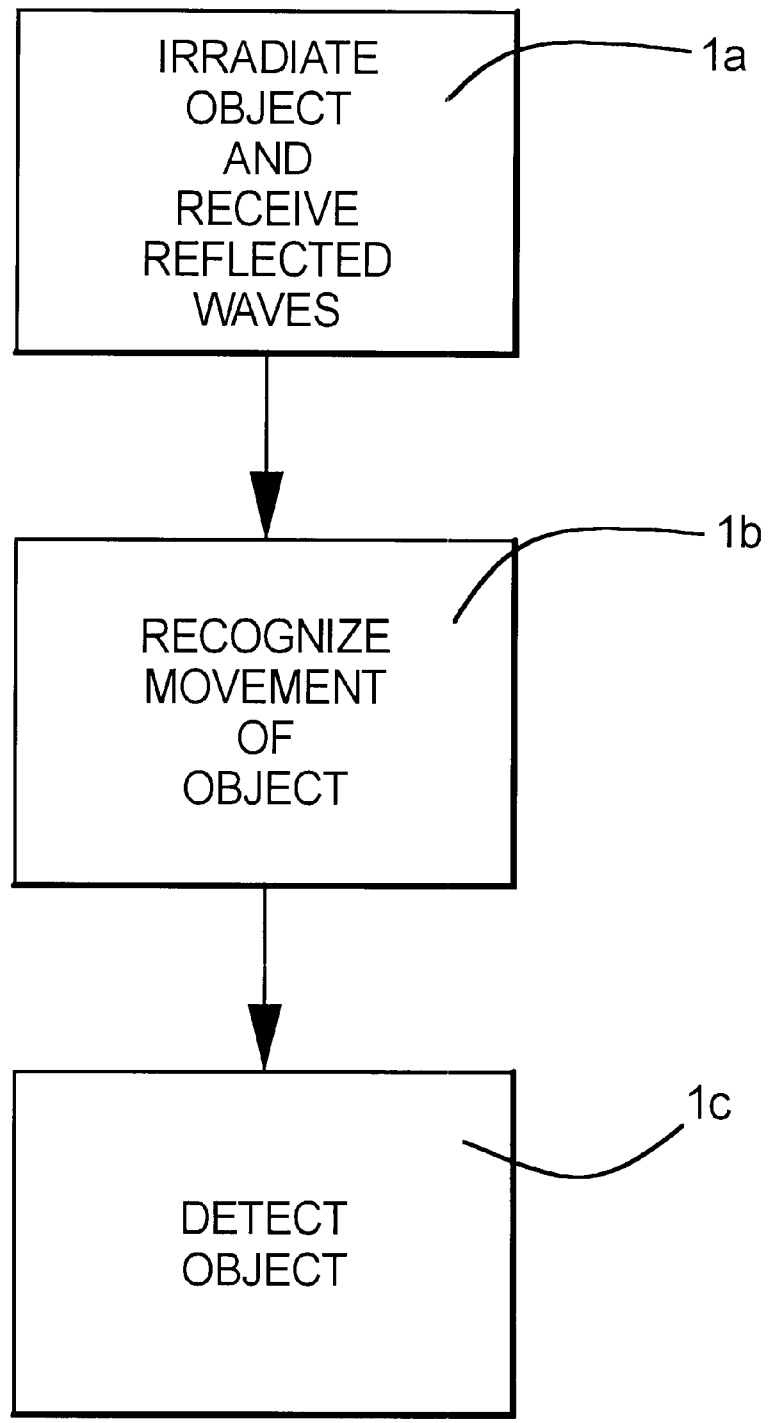
FIG. 1 is a block diagram that contains the steps of the inventive method.

FIG. 1 shows what steps the inventive method comprises. In a first Step 1a, a prescribable area is irradiated with waves in the invisible spectral range. A reception means that, above all else, advantageously registers the emitted waves in the invisible spectral range receives the waves reflected from the irradiated area. When a prescribable object is moved in the irradiated area, then the waves reflected from the object are distinguished with a recognition algorithm from the other waves reflected in the area (Step 1b). Finally, the object is detected (identified) in Step 1c. When this object recognized as input unit dwells for a prescribable time on a field linked to a control characteristic, this field being projected onto the area, then the control characteristic is triggered, comparable to clicking with a mouse on a field suitable therefor.

Figure 2:
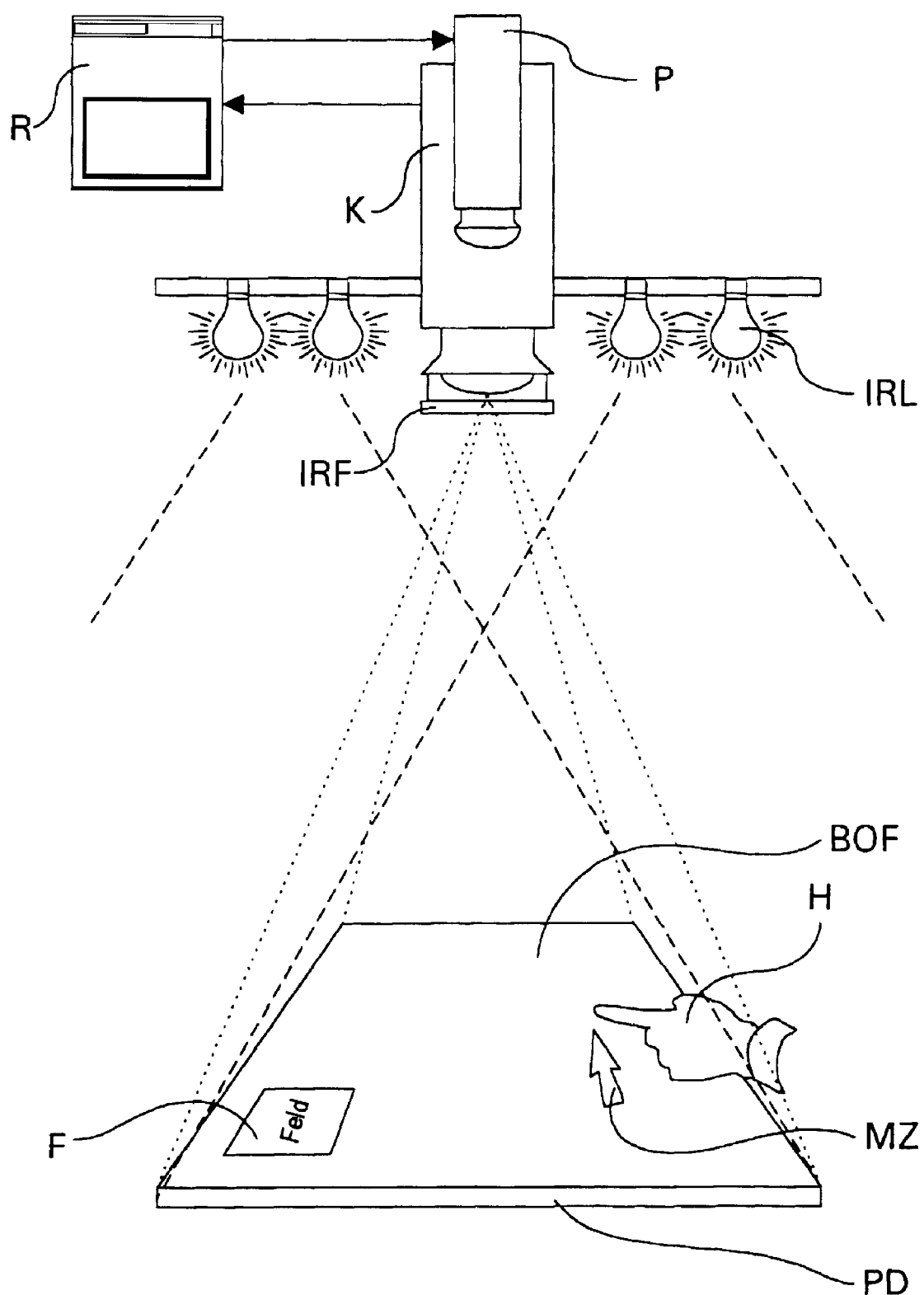
FIG. 2 a sketch that shows the fundamental arrangement of a possible realization of the invention.

FIG. 2 shows a possible inventive arrangement with no intention of a limiting effect on the basis of a virtual touch screen. A user interface BOF is imaged onto a prescribable area, a projection display PD here. The projection display PD replaces a conventional picture screen in this case. The input ensues by direct pointing, indicated in FIG. 2 by the hand H, onto the user interface BOF. As a result thereof, keyboard, mouse, touch screen or digitization pad of conventional systems can, for example, be replaced. The recognition of gestures as well as the positioning within the user interface BOF are realized by a video-based system (gesture computer) that is in the position to recognize and track projection and shape of, for example, the human hand in real time (described, for example, in German reference DE 195 16 664 C1 and U.S. Pat. No. 5,528,263.

In the example shown in FIG. 2, the projection display is illuminated with infrared light. The infrared light source IRL can be advantageously implemented with infrared light-emitting diodes. A camera K that is preferably designed with a specific infrared filter IRF that is sensitive in the infrared spectral range registers the projection display PD. The user interface BOF is imaged onto the projection display PD with a projector P that is controlled by a computer R. The user interface BOF can thereby be fashioned like, for example, a menu system on a monitor of the computer R. A mouse pointer MZ is now not moved with a traditional input means such as, for example, an optical or mechanical mouse or a track ball but is moved by the hand H of the user. Instead of the hand H, for example, a pointer can also be employed. When, as in this example, the control characteristic of a field F on the user interface BOF is to be called, then the hand H is moved across the field F, whereby the mouse pointer MZ follows the hand H. When the hand H dwells over the field F for a prescribable time, then the control characteristic linked to the field F is triggered on the computer R.

The invention thus makes it possible to fashion the projection—the user interface BOF here—without influencing the registration, since the camera K is sensitive in the infrared range does not pick up the user interface BOF displayed by the projector. The information for the user projected in the visible spectral range is thus invisible for the evaluation of the input with the camera K by the computer R. No disturbing influences due to the projection thus arise. The information about the field F, which is displayed exclusively for the user by the projector P in the visible range but which is not acquired by the camera K, is found by relative positioning within the user interface BOF.

In order to assure that the projector P supplies an image that is invisible for the camera K, the projector P can be additionally equipped with an infrared blocking filter. The projector thus emits no infrared radiation whatsoever. What a specific infrared filter IRF in front of the camera K effects is that only infrared radiation in the specific wavelength of the radiation emitted by the infrared light source IRL is acquired.

The invention is not limited to the particular details of the method and apparatus depicted and other modifications and applications are contemplated. Certain other changes may be made in the above described method and apparatus without departing from the true spirit and scope of the invention herein involved. It is intended, therefore, that the subject matter in the above depiction shall be interpreted as illustrative and not in a limiting sense.

What is claimed is:

1. A system for detection of an object in an area irradiated by waves in an invisible spectral range, the system comprising:

a projector configured such that a video image is projectable onto the area;

a device for emitting waves in the invisible spectral range configured such that the area is substantially illuminated;

a reception device configured such that the reception device registers the irradiated area, the reception device being specifically balanced for an invisible spectral range corresponding to the waves; and a computer configured with a recognition algorithm, whereby the object irradiated by the emitted waves is detected using the recognition algorithm.

2. The system according to claim 1, wherein the device for emitting waves in the invisible spectral range has at least one infrared light source, and wherein the reception device is at least one camera.

3. The system according to claim 2, wherein the infrared light source is one of an infrared light-emitting diode and an incandescent bulb with an infrared filter.

4. The system according to claim 3, wherein the camera has a filter that is transmissive only for infrared light.

5. The system according to claim 4, wherein the filter of the camera is only transmissive for a spectral range of the infrared light-emitting diode or the incandescent bulb with an infrared filter.

6. The system according to claim 1, wherein the area is transilluminated from below with infrared light, and the projection surface is implemented reflective in a visible spectral range and is implemented transmissive in the infrared spectral range.

7. The system according to claim 1, wherein the device for emitting waves in the invisible spectral range has at least one device for emission of ultraviolet radiation, and wherein the reception device is at least one receiver for ultraviolet radiation.

8. The system according to claim 1, wherein the device for emitting waves in the invisible spectral range has at least one device for emitting ultrasound, and wherein the reception device is at least one receiver for ultrasound.

9. The system according to claim 1, wherein the device for emitting and the reception device lie on an optical axis.

10. The system according to claim 1, wherein the area has applied thereto at least one of reflective fabric, reflex films, and specific weave with prism-coated surface.

11. A method for detecting an object in an area, the method comprising the steps of:

generating a video image having at least one field with a function available thereto in the area by a computer, the video image being projected onto a predetermined area;

moving the object into the predetermined area;

irradiating the area by waves whose wavelength lies in the invisible spectral range in order to detect the object;

using a reception device specifically balanced for the invisible spectral range corresponding to the waves to detect the object; and triggering a function of a field by the object in that the object dwells in the field for a predetermined time.

12. The method according to claim 11, further comprising the step of moving a mouse pointer associated with the object across the projected area by moving a finger of a user.

13. The method according to claim 11, further comprising the step of implementing the predetermined area as a canvas.

14. The method according to claim 11, further comprising the step of implementing the control characteristic as one of a finger of a user, a hand of a user or a pointer.

* * * * *